(No Model.) 5 Sheets—Sheet 1.

F. F. LANDIS.
GANG PLOW.

No. 316,045. Patented Apr. 21, 1885.

*Fig. 1.*

WITNESSES:
L. B. Hill
Wm. Duvall

INVENTOR
Frank F. Landis,
by E. E. Masson
Attorney.

N. PETERS, Photo-Lithographer, Washington, D. C.

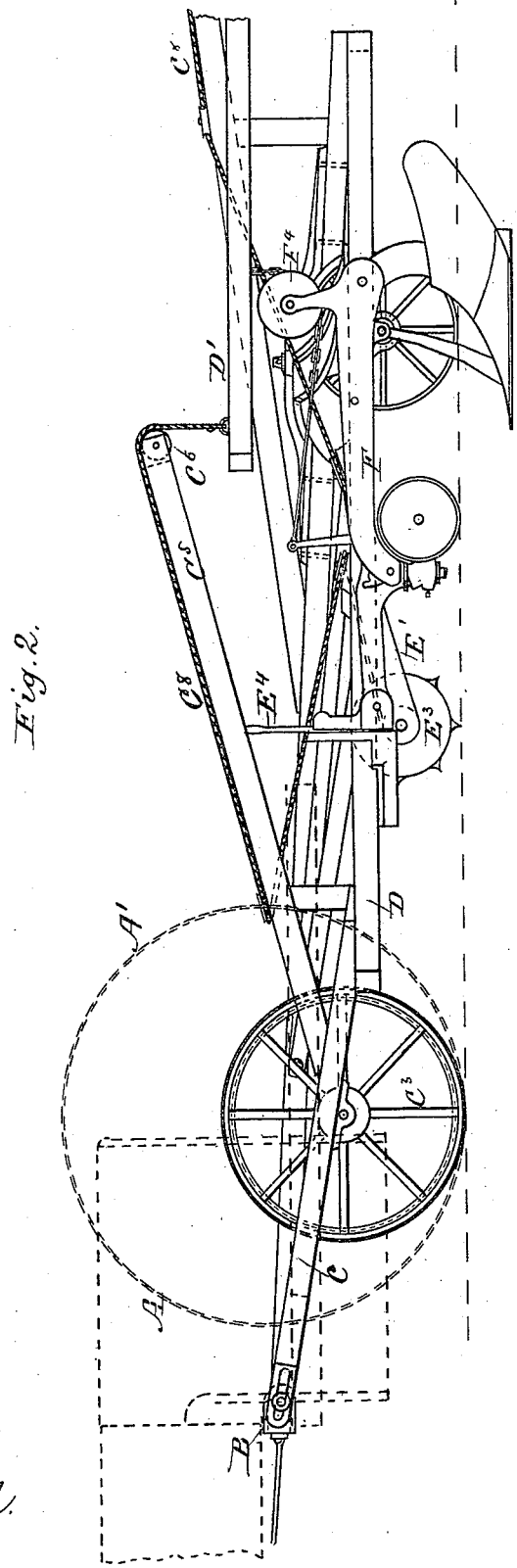

(No Model.) 5 Sheets—Sheet 3.
F. F. LANDIS.
GANG PLOW.
No. 316,045. Patented Apr. 21, 1885.
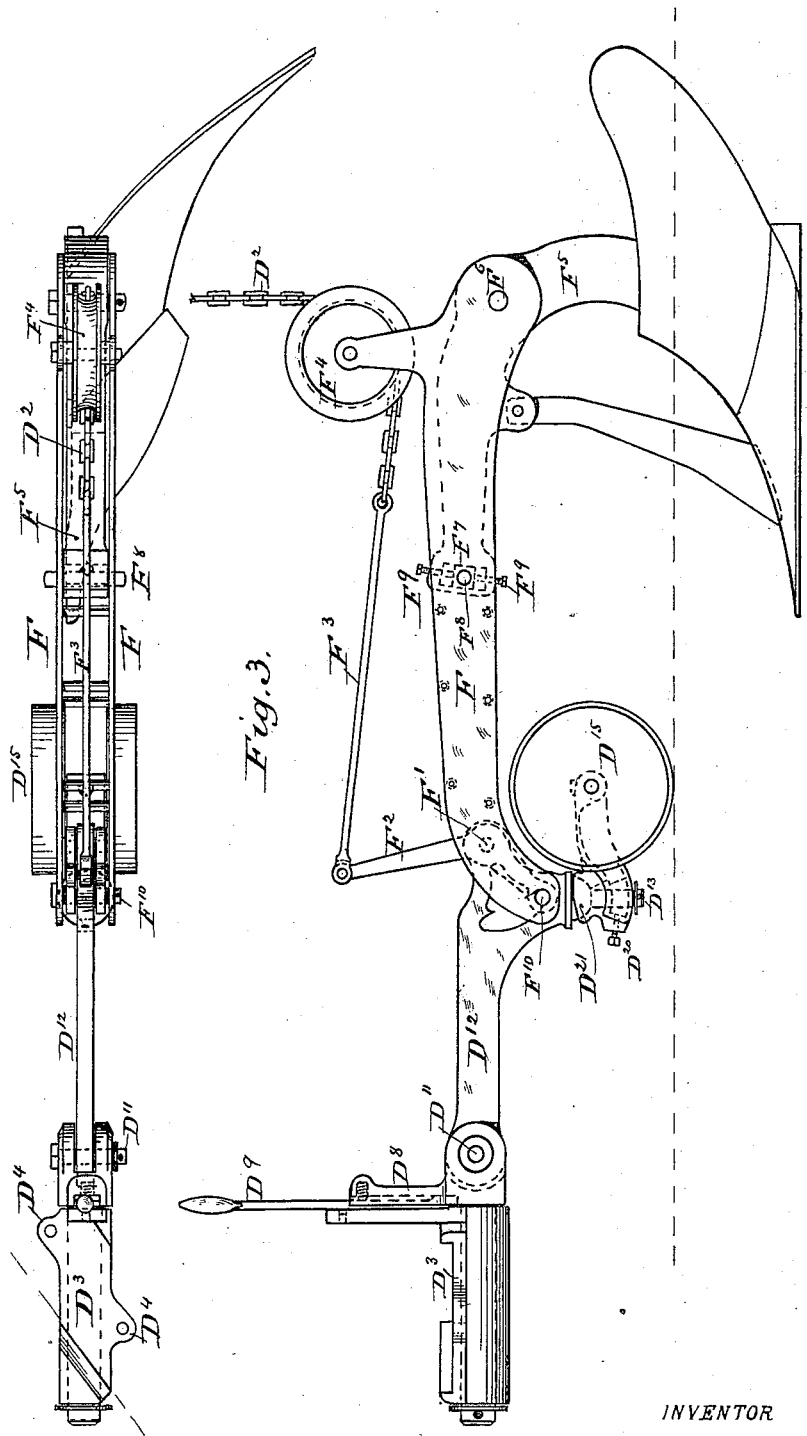
WITNESSES
L. C. Hills
Wm Duvall
INVENTOR
Frank F. Landis
by E. E. Masson
Attorney

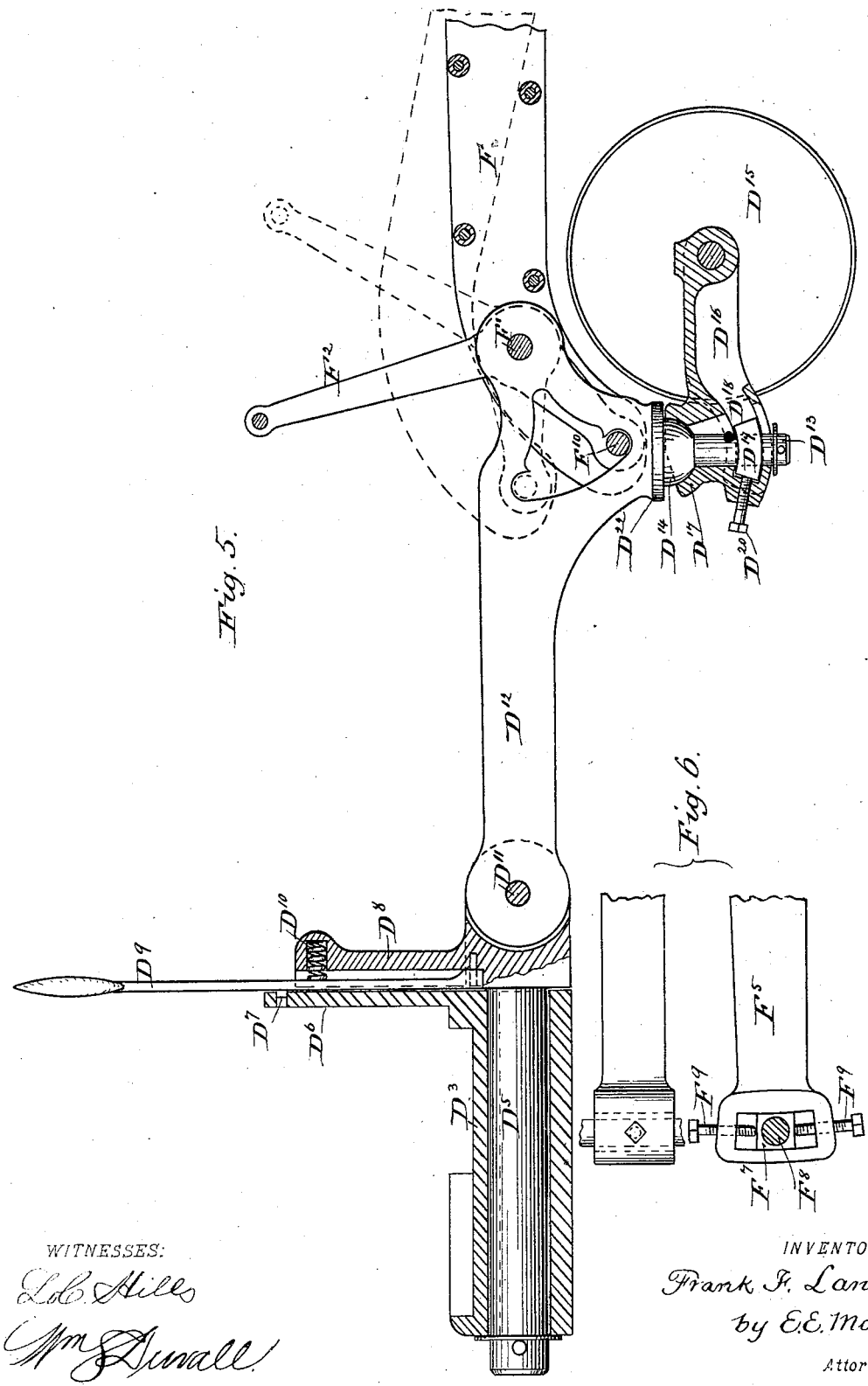

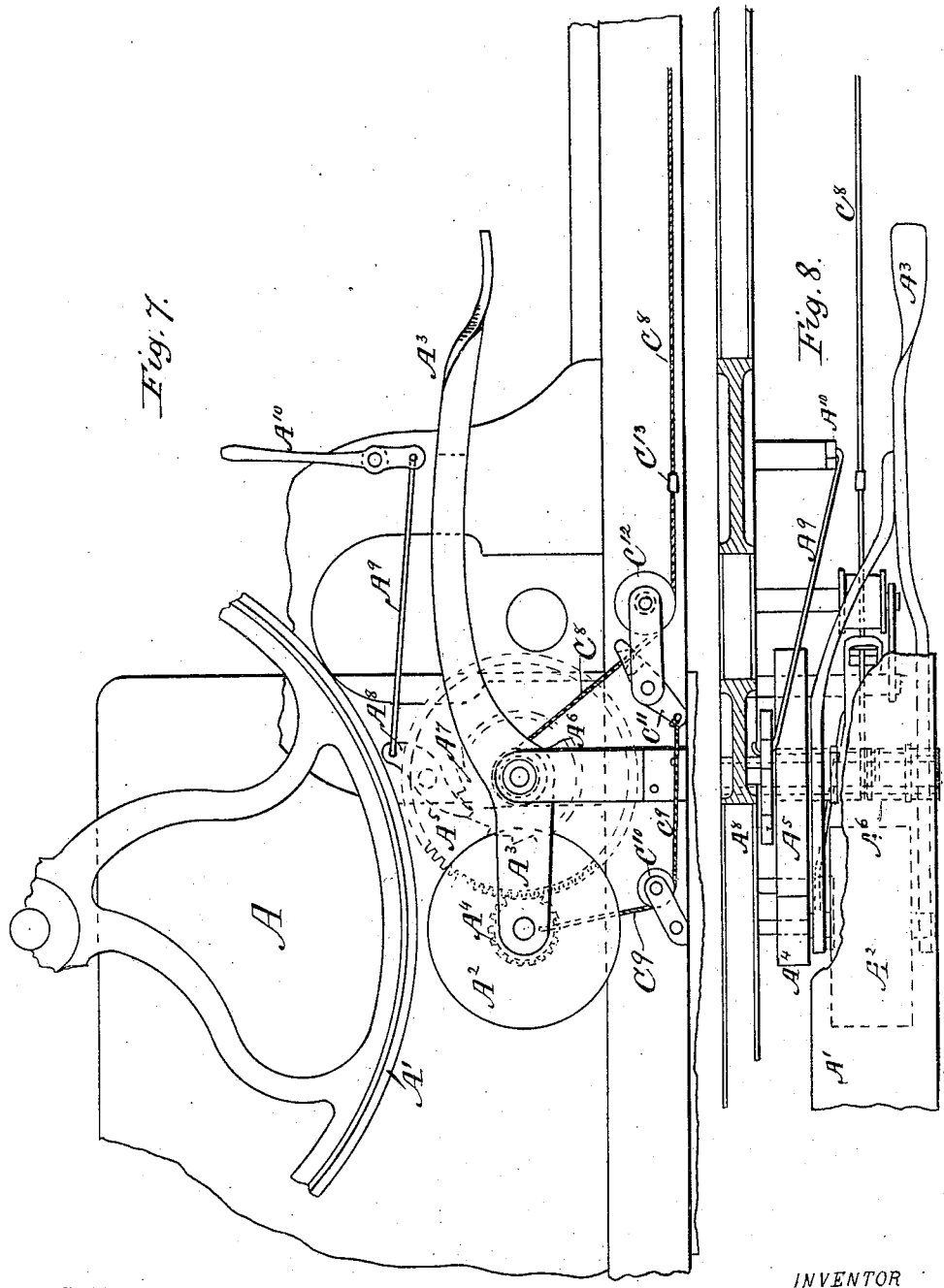

UNITED STATES PATENT OFFICE.

FRANK F. LANDIS, OF WAYNESBOROUGH, PENNSYLVANIA.

GANG-PLOW.

SPECIFICATION forming part of Letters Patent No. 316,045, dated April 21, 1885.

Application filed May 28, 1884. (No model.)

*To all whom it may concern:*

Be it known that I, FRANK F. LANDIS, a citizen of the United States, residing at Waynesborough, in the county of Franklin and State of Pennsylvania, have invented certain new and useful Improvements in Gang-Plows, of which the following is a specification, reference being had therein to the accompanying drawings.

This invention has relation to gang-plows, and has reference particularly to the manner of connecting each plow of the gang to the draft-beam connected with the motor, and to the manner and means of governing the action of each plow of the gang when in operation, and to the manner of and means for throwing each or all of the plows of the gang out of action, and this latter function may be formed through the medium of devices operated directly or indirectly by power derived from the motor.

Other objects and purposes of the invention will appear in the following description thereof, and the novel features disclosed will be specifically set forth in the claims.

Referring to the drawings, Figure 1 is a plan of so much of a series of gang-plows and of a steam-motor for operating the same as is sufficient to the clear understanding of the invention. Fig. 2 is a side elevation of the parts shown in Fig. 1. Fig. 3 is a side elevation, and Fig. 4 a plan, of one of the plows and the devices for connecting it to the gang draft-beam. Fig. 5 is an enlarged side elevation, partly in section, of a similar portion of the apparatus to that disclosed in Figs. 3 and 4. Fig. 6 is a plan and side elevation of the plow-beam-adjusting devices; and Figs 7 and 8 are a side elevation and a plan, respectively, of mechanism for controlling the action of the plows by means of power derived from the motor.

Like letters indicate like parts in all the figures.

A in dotted lines, Figs. 1 and 2, represents the boiler and traction-wheels of a steam-motor employed for operating the plows. In front of the fire-box portion of the boiler is a transverse draft-bar, B, secured by braces and any other suitable attaching devices, and provided at each of its ends with a casting, B', having a pivot, B², projecting therefrom, the said casting in this instance being adapted to receive the cross-bar, and being held in place at the end thereof by means of the same bolts that connect the braces with the cross-bar, the opposite ends of the braces being secured to any desired portion of the motor or its frame-work. At the sides of the motor outside of the traction-wheels are the longitudinal draft-bars C, the forward end of the same being provided with a casting, C', adapted to receive the pivot B² of the transverse draft-bar. Any other means than those just described for pivotally connecting the longitudinal and transverse draft-bars may be substituted. One of the longitudinal draft-bars is provided with a frame, C², having a bearing for the shaft of a follower or frame-supporting wheel, C³, the opposite end of the shaft of which is journaled on or in the longitudinal draft-bar. This follower or supporting wheel C³ in this instance is arranged upon the inside of the longitudinal draft-beam and within the limits of the traction-wheel A' of the motor, and the center of the wheel C³ is arranged in substantially the same vertical plane as is the axle upon which the traction-wheel is mounted, so that the undulations of the ground are simultaneously followed by both the traction-wheel and the follower or supporting wheel; and it is evident that a supporting-wheel, as C³, may be secured under both of the draft-bars at the sides of the motor, and said wheel may be mounted upon either the inside or outside of said draft-bar; and although I have shown the wheel C³ arranged directly beneath the center of the traction-wheel axis, to insure simultaneous following of undulations in the ground, still I would secure substantially the same benefits by arranging the follower-wheel at other points adjacent to the axle, and I therefore do not limit my invention to the exact arrangement shown of the follower-wheel relatively to the traction-wheel. In the rear of the motor, and arranged diagonally extending from one of the longitudinal draft-bars to the other, is the gang draft-beam D, to which the front end of each plow-beam in the gang is secured. That one of the longitudinal draft-beams which is not provided with a follower or frame-supporting wheel is provided with a caster, C⁴.

Substantially in line with the longitudinal draft-bars and secured thereto and inclined upwardly therefrom are two beams, C⁵, having pulleys C⁶, which, with the pulleys C⁷, serve to guide the elevating chain or ropes C⁸, which extend from the rear gang-beam, D′, to the windlass E, for a purpose hereinafter described. The rear gang-beam, D′, is connected with each plow of the gang by means of a chain, D², or its equivalent. (See Fig. 3.) The windlass E is journaled in the frame E′, pivoted to the front gang-beam, as at E², and is provided with a spurred ground-wheel, as E³. Now, by means of the lever E⁴ (see Fig. 2) the pivotal carrying-frame E′ may be depressed carrying the windlass with it until the spurred wheel comes in contact with the ground, and is thereby put in motion as the gang and motor move, so as to wind the rope C⁸ upon the drum of the windlass, which through the medium of the elements, thus far described, elevates the rear gang-beam and draws upon the chain D², connected with each plow of the gang. Now, by any suitable means, as a pawl and ratchet or a ratcheted sector-plate, (commonly used in operating levers, such as the lever E⁴,) the ropes when once wound upon the drum may be maintained in that condition and the ground-wheel elevated, so that the entire gang is rendered inoperative.

So far as described, when it is desired to operate the cords C⁸ by the power generated in the motor, I employ the construction illustrated in Figs. 7 and 8—that is to say, in suitable proximity to the fly-wheel or other rotative portion of the motor I support a friction-pulley, A², in the end of the pivoted lever A³, which projects to the rear where it is accessible to the operator, the rear end in this instance being formed so as to be operated by the foot of the operator in order to throw the friction-pulley A² in contact with the fly-wheel A′, whereby motion is conveyed to the pulley. Upon the shaft of the friction-pulley is mounted a pinion, A⁴, and arranged to mesh therewith is a gear, A⁵, secured to the shaft of a winding drum, A⁶, the same shaft or the pulley being provided with a ratchet, A⁷. The pawl A⁸ is arranged to operate in the ratchet, and may be released therefrom by means of a rod, A⁹, connected with the lever A¹⁰ in a position accessible to the operator. The cord or cords C⁸ pass through a check device, (hereinafter described,) to the winding drum or cylinder A⁶.

The checking device comprises the following elements: To the shaft of the friction-pulley, or the lever carrying it, is secured a cord, C⁹, which passes through the guide-pulley C¹⁰, and is secured to the end of the lever C¹¹, the opposite end of which is perforated for the passage therethrough of the cord or cords C⁸. From the center of the lever C¹¹ is supported a pulley, C¹², and on the cord or cords C⁸ is a stop or stops, C¹³. The operation of these parts is as follows: When the free end of the lever A³ is depressed, by placing the foot thereon the friction-pulley is thrown in contact with the fly-wheel and is rotated, and at the same time rotates the geared friction-pulley A⁶ and ratchet-wheel A⁷, the pawl A⁸ being held from contact with the latter. The cord or cords C⁸ are wound upon the drum A⁶, and at the same time the cord C⁹ is held under tension upon the drum of the friction-pulley, the length of the cord C⁹ being regulated, so that when the stop C¹³ comes in contact with the perforated end of the lever C¹¹ the draft on the cord is exerted on the cord C⁹, and thus the friction-pulley is drawn away from the fly-wheel. If, now, the pawl A⁸ be thrown into operation, the plows are held in an elevated position. Attention is now directed to the specific manner and means employed in the connection and operation of each individual plow in the gang. D³ represents the casting by means of which the immediate connection of each plow of the gang and the forward gang draft-beam is made. It is provided with a diagonally-grooved surface with diagonally-disposed perforated lugs D⁴, through which bolts are passed upwardly into or through the draft-beam. This arrangement leaves the body of the casting in a direct line coinciding with the line of draft, which body is bored or otherwise adapted to receive the cylindrical portion of the coupler D⁵.

By referring to Fig. 5 it will be seen that the casting D³ has an upright standard, D⁶, provided with an aperture, D⁷, while the coupler also has a standard, D⁸, and a lever, D⁹, which is pressed by means of a spring, D¹⁰, toward and against the upright D⁶, and has a pin adapted to enter the aperture D⁷. The rear end of the coupler is slotted vertically, and provided with a transverse bolt or pin, D¹¹, whereby it is adapted to receive a link, D¹², which forms a portion or an element of my compound plow-beam.

The operation of these elements just described is as follows: By means of the lever D⁹ the coupler and the attached plow-beam, as well as the plow connected thereto, may be oscillated, inclined, or canted, if desired, for any purpose, such as avoiding obstacles in the path of the plow and plowing on inclined ground. When the lever D⁹ is held in place by means of the catch, latch, or projection, or pin, the connection of said lever being pivotal to the standard D⁸, and its location being within a pocket or chamber formed in said standard, it is apparent that there may be provision made for a slight canting of the plow during its operation by forming the lever and the chamber in which it rests so that there shall be slight play of the upright D⁸. On the other hand, by making said chamber of sufficient width only to receive the lever the plow will be held rigidly in a truly vertical line while the lever is held by the stop, latch, or pin. The rear end of the link D¹² is connected to the plow-beam F pivotally by means of a bolt or shaft, F′, passing through the link and through the lever F², (which bolt also serves the pivotal bearing for the lever F²,) to which the chain D² is connected, in this instance by means of a rod, F³. Near the rear end of the plow beam F a pulley, F⁴, is mounted, around which the chain D² passes. The plow-beam proper, F⁵, is pivoted at F⁶ in the rear end of the beam F. The beam F is formed of two plates or side pieces, so that the beam F⁵ is arranged between them, and in this instance, as shown in Fig. 6, is slotted at its free end and embraces a box, F⁷, mounted on a hard-wood pin, F⁸, passing through the sides of beam F, and is provided with adjusting-screws F⁹, adapted to bear against the box, whereby the pitch, slant, or presentation of the plow to the ground is adjustably determined. The pin F⁸ will break when obstructions are met which would otherwise damage the machine. The rear end of the connecting-link D¹² is slotted to receive a cross-pin, F¹⁰, arranged in the free ends of the bifurcated shorter arm of the lever F², the ends of the slot being such a distance apart as to limit the movement of the lever F² to a desired extent. The said bolt F¹⁰ is secured or connected to the front ends of the side plates of the beam F, which embraces the link and the bifurcated arms of the lever F², while the bolt F′, upon which the lever F² is pivoted, does not project into or through said side frames, so that as the lever F² is drawn to the rear, as shown in dotted lines Fig. 5, the beam F is elevated, and therefore the point of the plow is inclined upwardly, as the first result of winding up the cords C⁸, so that the continuation of said winding may the more easily elevate the plows entirely free from the ground. This preliminary changing of the angle of presentation of the plow, to facilitate removal thereof from the ground, is one of the important advantages of my invention, as well as one of the novel features. The connecting-link D¹² is provided with a downwardly-depending pivot or stud, D¹³, the base D¹⁴ of which is substantially semispherical.

D¹⁵ represents a caster journaled in a U-shaped frame, D¹⁶, provided with cup-shaped top D¹⁷, adapted to fit the base D¹⁴ of the pivot or stud D¹³. The frame is also provided with the aperture or recess D¹⁸, adapted to receive a box, D¹⁹, which is perforated for the reception and passage therethrough of the stud D¹³. A set-screw, D²⁰, is set in the front end of the frame, and is adapted to be forced against the box D¹⁹, to determine the height at which the front end of the beam F shall be supported by the caster-wheel D¹⁵, and therefore regulating the depth of furrow. For this purpose the passage in the head of the frame for the pivot or stud D¹³ is elongated from front to rear, while it is about equal in width to the diameter of the pivot.

Having described my invention and its operation, what I claim is—

1. The combination, with the motor A, of the transverse draft-bar, the pivotally-connected side draft-bars hinged to the frame forward of the traction-wheels' axle, and provided with one or more following wheels, and the diagonally-disposed gang draft-bar, substantially as shown and described.

2. The combination, with the longitudinal draft-bars, diagonal gang draft-bar, a casting secured thereto and having a bore in line with the line of draft, and a coupler having a cylindrical body adapted to fit said bore, and means for canting the coupler, substantially as specified.

3. In combination with the front diagonal draft-bar, longitudinal draft-bars provided with upwardly-inclined beams having pulleys of a rear diagonal gang-bar connected by cords or chains and intermediate pulleys with each plow of the gang, an elevating cord or cords, and means, substantially as specified, for operating the same.

4. The combination, with a front diagonal draft-bar, of a gang of plows connected thereto, a rear diagonal gang-beam connected to the plows by chains and intermediate pulleys, and a cord or cords or their equivalents connected to the rear gang-beam and to a windlass adapted by a suitable lever to be thrown into and out of operation, whereby the gang of plows may be elevated at will, substantially as specified.

5. In a gang-plow, a pivotally-supported windlass carrying cords or their equivalents connected with the gang, and connecting devices arranged and operated by means of the power generated by the motor, substantially as specified.

6. A pivotally-supported windlass connected with the gang by means of cords or their equivalents and adapted to be thrown into contact with the ground or with the moving part of the motor, substantially as and for the purpose set forth.

7. The combination of the motor, the gang of plows, an intermediately-arranged system of cords and pulleys for elevating the plows, and a windlass adapted to be operated by power developed by the motor to wind the cord or cords, and a pawl and ratchet to maintain the cords in a wound condition upon the windlass, substantially as specified.

8. The combination of a gang of plows pivotally connected with the gang draft-beam, a cord or cords, a windlass, and a stop upon said cord to determine the limit of action of the windlass, substantially as specified.

9. The combination of a pivotally-supported friction-pulley having a pinion and winding-drum, a windlass operated by the pinion of the friction-pulley, and a cord connected with the friction-pulley drum and with a lever constructed to embrace the cord from the main windlass and to be operated by a stop thereon, whereby the friction-pulley is withdrawn from the moving part of the motor when said stop comes in contact with said lever, substantially as specified.

10. The combination, with the fly-wheel of the motor, of a pulley, A², supported in the lever A³, and having a drum and a pinion, A⁴, the windlass A⁶, having the gear A⁵, the ratchet A⁷, and pawl A⁸, the rod A⁹, and lever A¹⁰, with the cords C⁸ and C⁹, the former having a stop, $C^{13}$, and the latter connected to the lever $C^{11}$, and the pulleys $C^{10}$ and $C^{12}$, substantially as shown and described.

11. The combination of the windlass $A^6$, the cord $C^8$, having stop $C^{13}$, the pulley $A^2$, the cord $C^9$, pulleys $C^{10}$ $C^{12}$, and lever $C^{11}$, substantially as shown and described.

12. The combination, with the front diagonal draft-bar, of a casting bored in line of draft, a canting head mounted in said bore and provided with a standard having a lever, and means for maintaining the lever in an upright position, and means for pivotally connecting a plow-beam to said head, substantially as specified.

13. A compound plow-beam, comprising the beam proper, $F^5$, pivoted at $F^6$ between plates F, forming a main beam, and adapted, as by bolts $F^9$, to be adjusted substantially as specified.

14. The compound plow-beam, comprising a connecting-link, as $D^{12}$, and the beam F, embracing the same, and a lever pivoted to the link, the free end of which is pivotally connected to the beam, and means for operating the lever, whereby the point of the plow is upwardly inclined, substantially as specified.

15. The combination, with gang-plow beams and a series of cords to elevate the same, of a series of levers with chains connected to said beams to raise the forward end of each plow-beam during the first movement of the cords, elevating the gang-beam, substantially as specified.

16. A jointed plow-beam having a lever at the joint for directing the point of the plow, as described, in combination with a tilting head at the front end of the jointed beam, substantially as specified.

17. A jointed beam having a lever at the joint, the free end of the lever being pivoted to the front end of the beam, and the lever itself being pivoted to the rear end of the connecting-link, the pivot of the free end of the lever working in a slot formed in the rear end of the link, said slot serving to limit the movement of the lever, substantially as specified.

18. The combination of the beam F, the link $D^{12}$, and the lever $F^2$, pivoted at $F'$ at the rear end of said link, the front end of said lever being provided with the rod or bolt $F^{10}$, having bearings in the front end of the beam F and riding in a slot formed in the front end of said link, substantially as shown and described.

19. The link $D^{12}$, having the depending pivot $D^{13}$, provided with the semispherical base $D^{14}$, and the projecting flange or shoulder $D^{22}$, substantially as shown and described.

20. The caster-frame $D^{16}$, having the cup-shaped projection or top $D^{17}$ and the recess $D^{18}$, in combination with the pivot $D^{13}$, box $D^{19}$, and adjusting-screw $D^{20}$, substantially as shown and described.

21. The canting-head, comprising the cylindrical body $D^5$, the standard $D^8$, and lever $D^9$, and vertical slot provided with transverse bearings for the pivot $D^{11}$, in combination with the casting $D^3$, having the standard $D^6$, apertured for receiving a latch-pin or other retaining device formed on or as a part of or attached to said lever, substantially as shown and described.

22. The combination of the pivot $D^{13}$, having the rounded base $D^{14}$ and shoulder or flange $D^{22}$, with a caster-frame having the cup-shaped projection or top, the upper edges of which are inclined, substantially as specified.

23. In combination with the frame of a traction engine or motor, a gang-plow frame provided with a follower or supporting wheel journaled thereon, substantially in line with the axle of the motor, as described.

In testimony whereof I affix my signature in presence of two witnesses.

FRANK F. LANDIS.

Witnesses:
D. M. GOOD, Jr.,
J. A. SELLERS.